April 12, 1932. F. R. SCHMIDT 1,853,702
FLOW OPERATED VALVE
Filed July 3, 1930
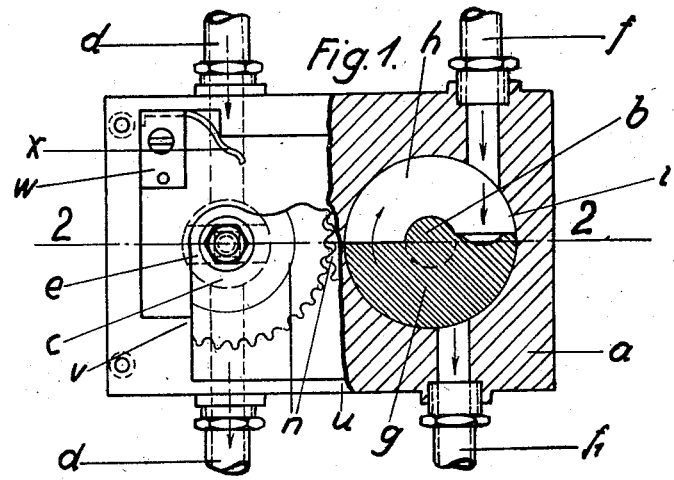
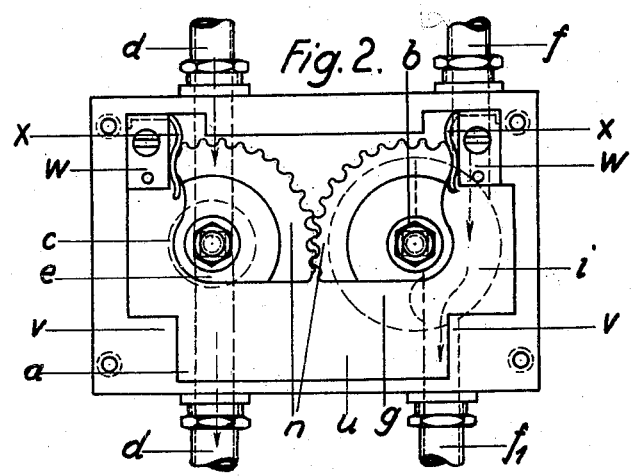
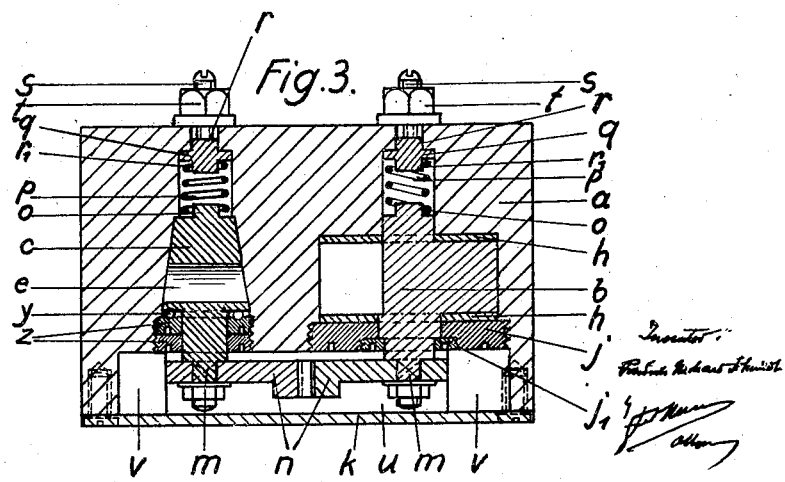

Patented Apr. 12, 1932

1,853,702

UNITED STATES PATENT OFFICE

FRIEDRICH RICHARD SCHMIDT, OF BRIGHTON, ENGLAND

FLOW OPERATED VALVE

Application filed July 3, 1930, Serial No. 465,633, and in Germany October 12, 1929.

This invention relates to combined gas and water valves for hot water producers, in which the water and gas admission, when the water valve is open, are simultaneously turned on by the water pressure and automatically shut off when the water pressure decreases. The automatic shutting off may be effected in known manner by devices, which are actuated by a weight or by pressure or by pull springs. If the gas and water valves are situated parallel side by side in a casing and the valves are rotary valves, the connection between the two valve bodies is effected in known manner by a common control element, engaging on a rotary arm on each of the valves.

This invention consists in that two gas and water valves mounted side by side parallel in a casing and formed in known manner as rotary or plug valves are coupled to a common movement by toothed segments on one side. Such coupling means are in themselves by no means new. In the present instance however the arm of leverage is always equally long independently of the angle of opening of the two valves, contrary to the known connection of the valve bodies.

According to the invention, as in the case of other known arrangements, gravity is utilized for closing the valves. Toothed segments, which are used for controlling the valves in common, are used in this instance as weighted levers. Owing to the fact that the toothed rim is further specially thickened, a particularly strong closing effect is obtained.

The difficulty with such arrangements is, to initiate the closing movement, that is, first to overcome the inertia of the open valves. For this purpose separate springs are provided, according to the invention, as stroke abutments for the opened toothed segments, which springs resiliently arrest the moved parts, the force stored up in the springs being then utilized to initiate the closing proceeding in a particularly energetic manner.

Further, according to the invention, torsion springs acting on the valve bodies are provided for assisting the closing movement of the valves, the axes of these springs coinciding with those of the valves. Such torsion springs are in themselves also known for closing valves, in the present instance however the torsional springs are also formed as pressure springs, which tend to lift the cock plugs from their seats so that thereby any sticking thereof is prevented. The torsional springs however serve, in conjunction with a device for regulating the tension from the outside, for adjusting the gravity effect of the means used for closing the valves to the different water pressure not only in the sense that the torsional springs are tensioned by the water pressure on the opening of the valves, but that the torsional springs can be tightened for assisting the water pressure in that their tension, even, if only slightly, can be regulated for the opening of the valves, for instance in the case that the water pressure should be too feeble to automatically lift the counter weights.

An embodiment of the invention is illustrated by way of example in the accompanying drawings in which:

Fig. 1 shows the valve in front elevation, the casing cover being removed, the right hand portion being a vertical central section, the valves being closed.

Fig. 2 is a similar view to Fig. 1, the valves being open.

Fig. 3 is a cross section on line 2—2 of Fig. 1.

A water valve $b$ and a gas valve $c$ are arranged parallel side by side in a casing $a$, which for the sake of simplicity is shown as a rectangular block. The water valve $b$ is constructed in a known manner as a disc valve and the gas valve $c$ as a cone valve. The gas main is arranged in a known manner concentrically to the discharge $e$ of the valve. The water supply pipe $f$ is on the other hand arranged almost tangentially to the disc valve $b$, whereas the delivery pipe $f_1$ is displaced more towards the centre of the valve. The valve $b$ is on one half made as a solid body $g$, whereas the other side has a cavity $i$ flanked by two walls $h$. In this manner the centre of gravity of the valve disc $g$ is displaced out of the axis in the body $g$, which consequently acts as a counter weight. The valve bodies $b$ and $c$ are each provided with a square pin $m$ projecting from the casing towards the front side determined by the closing cover $k$, on which pins meshing toothed segments $n$ are mounted. The toothed segments also act as counter weights in the closing direction. On the other end both the valves are each provided with a square pin $o$, around which the end of a torsional spring $p$ is wound. Each of these springs bears against a disc $q$, which has on each side a square pin $r$, $r_1$. The pin $r$ of the disc engages in a square hole of like size in the casing $a$. Opposite each of the square pins $r$ is a screw pin $s$, provided with a slot for accommodating a screw driver. The device is held in position by a nut $t$. The toothed segments $n$ are situated in a substantially rectangular cavity $u$ of the casing. Projections $v$ of the casing form abutments for the toothed segments. The other, opposite abutment side is formed by springs $x$, which are clamped by the lining elements $w$ inserted in the casing.

In the closed position the valves assume the position shown in Fig. 1, that is the closing surfaces are lying transversely in front of the inlet and outlet channels $f$, $f_1$. If a tap is opened, the valve $b$ is opened in the sense of rotation in the direction of the arrow by the pressure of the water in the direction of the arrows shown in Fig. 1. The cock plug $c$ participates in the rotation through the toothed segments $n$ and is also opened. The rotation continues until the water flow has free passage, as shown in Fig. 2. The disc body $g$ has then swung upwards about 90° around its pivot axle, the toothed segments are situated at the top and have contacted with the springs $x$, which are thus put under tension. The torsional springs $p$ are tensioned. When the water pressure ceases, the springs $p$, the springs $x$, the weight of the toothed segments $n$ and of the valve $g$ effect the closing of the valves $b$ and $c$.

The adjustment of the tension of the springs $p$ is effected in such a manner that, after partially loosening the nut $t$, a screw driver is inserted in the slot of the screw shank $s$ and the screw pressed against the pressure of the spring $p$ into the interior of the valve until the square projection $r$ disengages from its bearing. The screw $s$ can then be turned as desired to the right or to the left, whereby the spring $p$ is tensioned or relieved. The screw is then turned, the pressure decreasing, until the projection $r$ again jumps into its bearing, whereupon the nut $t$ is once more tightened. The springs $p$ then no longer act only as torsional but also as pressure-springs and relieve the valve cone $c$ in such a manner, that it cannot jam on its seat. Moreover the springs press the valve cone against a ball bearing $y$, through which an easy movement is obtained. Through the screwed-in double nuts $z$ a perfect packing can be obtained by the interposition of a packing medium, and a packing disc can also be introduced between the disc $q$ and the opposite casing wall. The water valve $q$ is packed also on the front side by screwed in discs $j$ and $j_1$, if desired with the interposition of packing discs.

I claim:

1. Combined gas and water valves for hot water producers, in which the water and gas admission are simultaneously turned on by the water pressure when the water valve is being opened and automatically shut off when the water pressure decreases, comprising in combination two valve bodies connected in parallel, two toothed segments connecting said valve bodies, and springs against which the ends of said segments abut when the valves are open adapted to utilize the force stored up for introducing the closing movement of the valves.

2. Combined gas and water valves as specified in claim 1, in which the toothed segments are so positioned and shaped that they form counter weight elements facilitating the closing of the valves.

3. Combined gas and water valves as specified in claim 1, comprising in combination with the valve bodies, a casing enclosing the valves, and adjustable torsional springs arranged between said casing and said valve bodies adapted to exert simultaneously a turning and pressing effect on said valve bodies.

4. Combined gas and water valves as specified in claim 1, comprising in combination with the valve bodies, a casing enclosing the valves, torsional springs between said casing and said valve bodies, a pin on each of said valve bodies rigidly connected to one end of said springs, a disc, for each of said valve bodies, a pin on each of said discs adapted to engage the other end of said springs, a prismatic projection on each of said discs, a wall of said casing having a cavity corresponding in shape to and adapted to accommodate said prismatic projection, and a screw pin on each of said discs projecting from the wall of said casing.

In testimony whereof I affix my signature.

FRIEDRICH RICHARD SCHMIDT.